United States Patent [19]

Hiiragizawa

[11] Patent Number: 5,680,593
[45] Date of Patent: Oct. 21, 1997

[54] DATA PROCESSOR HAVING PRECISE TIMER OUTPUT

[75] Inventor: Yasunori Hiiragizawa, Tokyo, Japan

[73] Assignee: NEC Corporation, Tokyo, Japan

[21] Appl. No.: 510,651

[22] Filed: Aug. 3, 1995

[30] Foreign Application Priority Data

Aug. 3, 1994 [JP] Japan .................. 6-182121

[51] Int. Cl.$^6$ ............................................ G06F 1/04
[52] U.S. Cl. ............................................ 395/555
[58] Field of Search .......................... 395/550, 555

[56] References Cited

U.S. PATENT DOCUMENTS 5,323,066  6/1994  Feddeler et al. .

FOREIGN PATENT DOCUMENTS 0 398 194  11/1990  European Pat. Off. .
2-224082  9/1990  Japan .
3-40185  2/1991  Japan .

*Primary Examiner*—Thomas M. Heckler
*Attorney, Agent, or Firm*—Young & Thompson

[57] ABSTRACT

A data processor is disclosed which shows an improved real time performance by carrying out the starting and clearing operations of a timer in response to an external trigger input. In the timer unit of the unit of the data processor, a flip-flop is set during the low level period of a count enable signal, and a prescaler and a timer are cleared and inactivated by bringing the outputs of OR gates to the-high level. As the count-enable signal goes to the high level, an edge-detection circuit output a detection pulse by detecting a level change of the external trigger signal. The flip-flop is reset by the detection pulse, and the operation of the prescaler is started and a count clock is supplied to the timer to start the counting operation of the timer.

7 Claims, 9 Drawing Sheets

DATA PROCESSOR HAVING PRECISE TIMER OUTPUT

BACKGROUND OF THE INVENTION

1. Field of the Invention

The present invention relates to a data processor and, more particularly, to an improvement of a data processor incorporating a timer counter as a peripheral unit.

2. Description of the Prior Art

A schematic block diagram of such a data processor is shown in FIG. 5. This data processor 10 includes a central processing unit (CPU) 1 which executes a program stored in a memory (not shown), a timer unit 2 which starts the counting operation in response to an instruction of the CPU or a trigger signal supplied from an external device (not shown) to a trigger terminal 3, and an internal bus 5 interconnecting the CPU 1 and the timer unit 2. The unit 2 has a pulse output terminal 4 through which a control pulse produced by the timer unit 2 is transferred to the external device.

The CPU 1 controls the operation of the timer unit 2 via the internal bus 5 in accordance with programmed operating procedures, and cyclically monitors the level of the terminal 3 via the internal bus 5 by executing a certain instruction. Although not shown, the data processor 10 is initialized by a system reset signal.

Referring to FIG. 6, the timer unit 2 includes a prescaler 113 which outputs a clock signal CLK 112 by frequency-dividing a system clock $f_{CLK}$ 111, and the clock signal CLK is supplied and thus counted by a timer 114. The count value of the timer 114 is then compared by a first compare register 115 which outputs a compare match signal when the count value of the timer 114 is equal to a value (n) set therein and further compared by a second compare register 116 which outputs a compare match signal when the value of the timer 114 is equal to a value (m) set therein. The signal of the compare register 115 sets a flip-flop (referred to as FF hereinafter) 117 and the compare match signal from the second compare register 116 resets the FF 117. The output Q of the FF is supplied to the external device as the control pulse via the terminal 4. The timer unit 2 further includes an edge detection circuit 118 which is connected to the external trigger terminal 3 and detects a change in level the external trigger signal, to produce a one-shot pulse signal, a control register 119 which has a count-enable flag (referred to as CE hereinafter) to control the operation of the timer 114 and the prescaler 113, an inverter 121 receiving a signal 120 indicative of the CE 120, and OR gates 124 and 125 receiving the outputs of the edge detection circuit 118 and the inverter 121. The output of the OR gate 124 is connected to the clear input of the prescaler 113 and the output of the OR gate 125 is connected to the clear input of the timer 114. The value n and m to be set respectively into the compare registers 115 and 116 as well as the data to be set into the control register 119 are supplied from the internal bus 5 from the CPU 1.

In operation, the external device informs the data processor 10 of the requirement of the control pulse by changing the level of the trigger signal. This means the timer unit 2 is required to be deactivated until the trigger signal is first changed in level after the system reset operation. For this purpose, the CPU 1 supplies and stores the control data into the register 119 with the CE flag of logic "0" during the system reset operation. The inverter 121 thereby produces the high level signal which in turn changes the clear signal CLR to the high level through the OR gates 124 and 125. The prescaler 113 and the timer 114 are thus brought and maintained into a clear state.

Once the trigger signal is changed in level, the timer unit 2 is then required to be activated. To this end, the CPU cyclically monitors the level of the trigger signal in the course of the program execution after the system reset operation, as well known in the art as a so-called polling operation.

Assuming that the trigger signal 3 is changed to the low level by the external device at a timing t1 as shown in FIG. 7, the CPU 1 detects that level change by the polling operation and then stores the CE flag data of logic "1" into the control register 119 by executing a string of instructions, at a timing t2 as shown in FIG. 7. The clear signal CLR is thereby changed to the low level to allow the prescaler 113 and the timer 114 to operate. As a result of the timer 114 proceeding with counting, when the count value of the timer 114 becomes equal to the data "n" set into the compare-register 115, the compare-register 115 sets the FF 117 to thereby change the control pulse 4 to the high level at a timing t3 shown in FIG. 7. When the timer 114 further proceeds with counting to reach the value "m" set into the compare register 116, the FF 117 is reset to change the control pulse 4 to the low level.

The trigger signal 3 is thereafter changed to the high level because the external device requires another control pulse. Accordingly, the control pulse 4 is produced again in the same manner as described before.

As is apparent from the above, the period "Tx" between the timings t1 and t2 depends on the program execution of the CPU 1. For this reason, it is unavoidable to make the timing t1 coincident precisely with the timing t2. In other words, the external device receives in the first request the control pulse 4 with the time delay determined by the periods Tx+T0 and in the succeeding requests the pulse 4 with the delay determined only by the period T0. The period Tx is uncontrollable as discussed above.

To this end, the timer start technique by the use of hardware rather than relying on the program processing is disclosed in Japanese Patent Application Laid Open No. 3-40185 (1991). This technique will be described below with reference to FIG. 8. This timer unit is constituted of a counter 401 having an output OUT, an input switch 402 which has the counter clock as the input, and switches whether or not to supply the clock CLK to the counter 401, and an input control circuit 403 which is connected to an external input IN with its output connected to the input switch 402, and controls the operation of the input switch 402.

Next, referring to FIG. 9, the operation of this prior art timer unit will be described. In this system, after the system reset, the input switch 402 is opened without fail by the input control circuit 403, and the system goes to the state which will not accept the external input IN during the period until the initialization is completed. After the completion of the initialization, the input control circuit 403 goes to the state that can accept the external input IN, and when the external input IN becomes effective, the input control circuit 403 connects the input switch 402, supplies the clock CLK to the counter 401 and the counter 401 starts the increment operation.

As in the above, in this conventional example, an improvement of the real time performance at the time of start of the counting operation and a reduction of the load on the CPU are realized by halting the operation of the counter 401 after the system reset and controlling the operation start of the counter 401 directly with the hardware (input control circuit 403).

As described in the above, in the timer unit shown in FIG. 6, the timer start from a halt state is controlled by a count enable signal controlled by the program processing. Accordingly, when the pulse output control synchronized with the external trigger signal is desired, it is difficult to obtain a highly precise pulse output because of the dispersion in the execution time of the program processing carried out during the period from the start trigger from the outside to the timer start. Moreover, the controllability is poor because of the difference in the control method of the timer unit at the time of start and during the continuous operation.

Furthermore, in the conventional example in FIG. 8, only the case of starting the timer from the initial state is imagined, so that when the timer is in the continuous operation, it is necessary to carry out the same control as at the starting time even in the case of repetitive control of the operation by the external trigger.

SUMMARY OF THE INVENTION

It is therefore an object of this invention to provide a data processor which is capable of obtaining a highly precise timer output by the adopting of the same control method at the time of timer start and at the time of continuous operation thereafter.

According to this invention, a data processor comprises first means for, when activated, producing a pulse signal in response to a clock signal, storage means for temporarily storing control information settable to one of first and second states, second means respective to said first state of said control information for deactivating said first means, third means for detecting supply of a trigger signal to produce a detection signal, and fourth means responsive to said second state of said control information and said detection signal for activating said first means.

As a result, a response time of activating the first means depends on only the trigger signal, so that the response time usually becomes constant.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DESCRIPTION OF THE PREFERRED EMBODIMENTS

Figure 1:
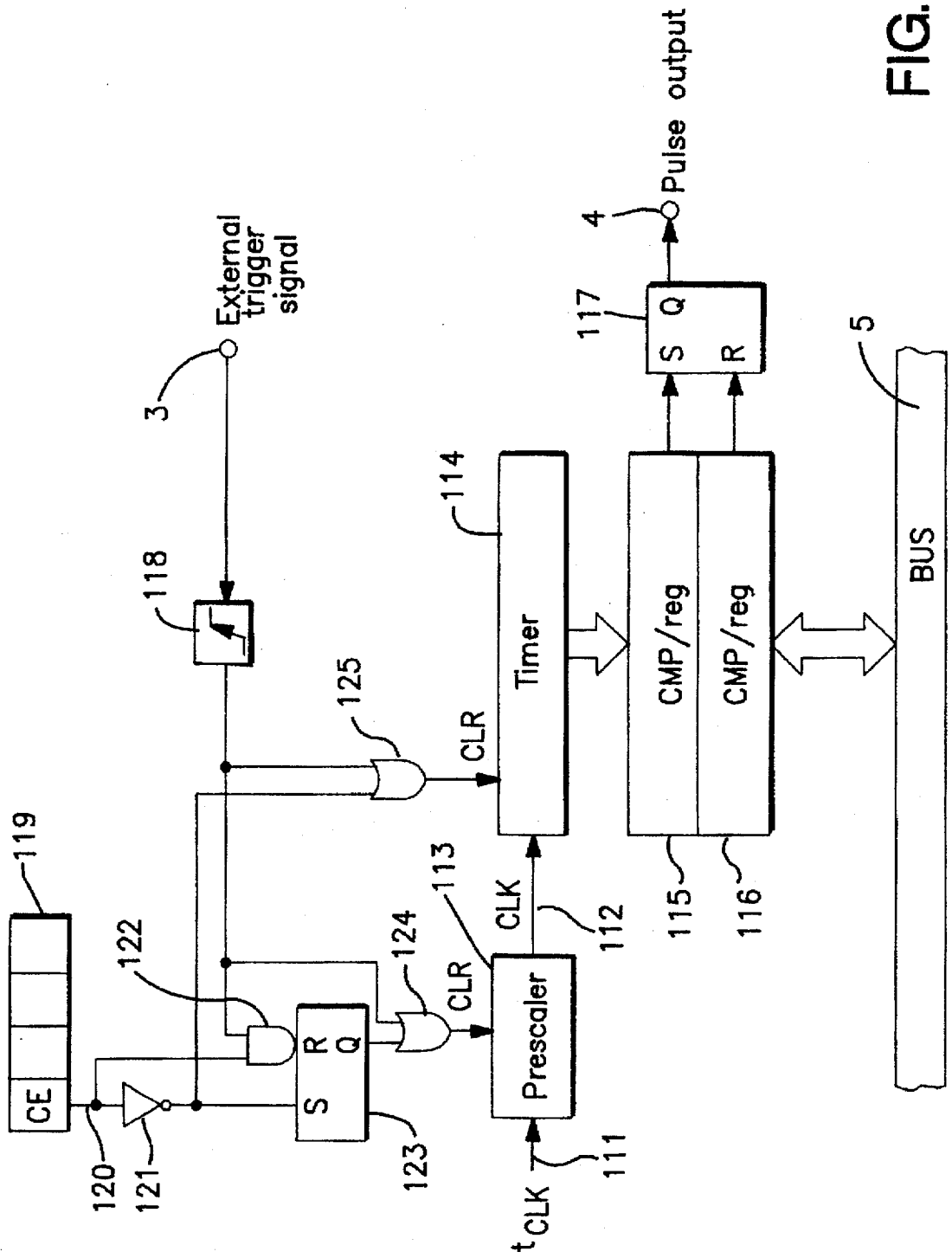
FIG. 1 is a block diagram of the timer unit of an embodiment of this invention.

Referring to the drawings, the embodiments of this invention will be described in the following.

Figure 5:
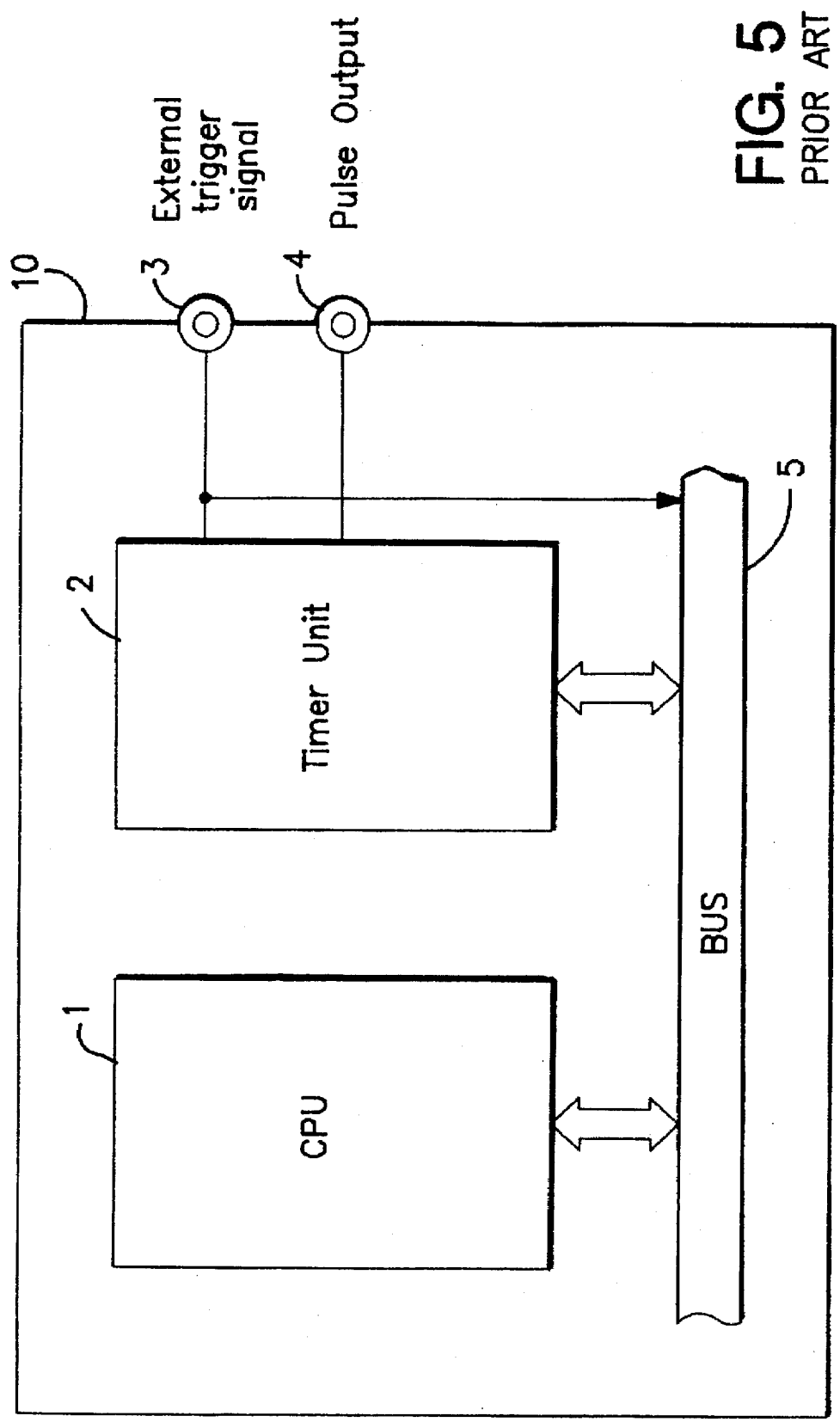
FIG. 5 is a schematic block diagram of the data processor having a timer.
Figure 6:
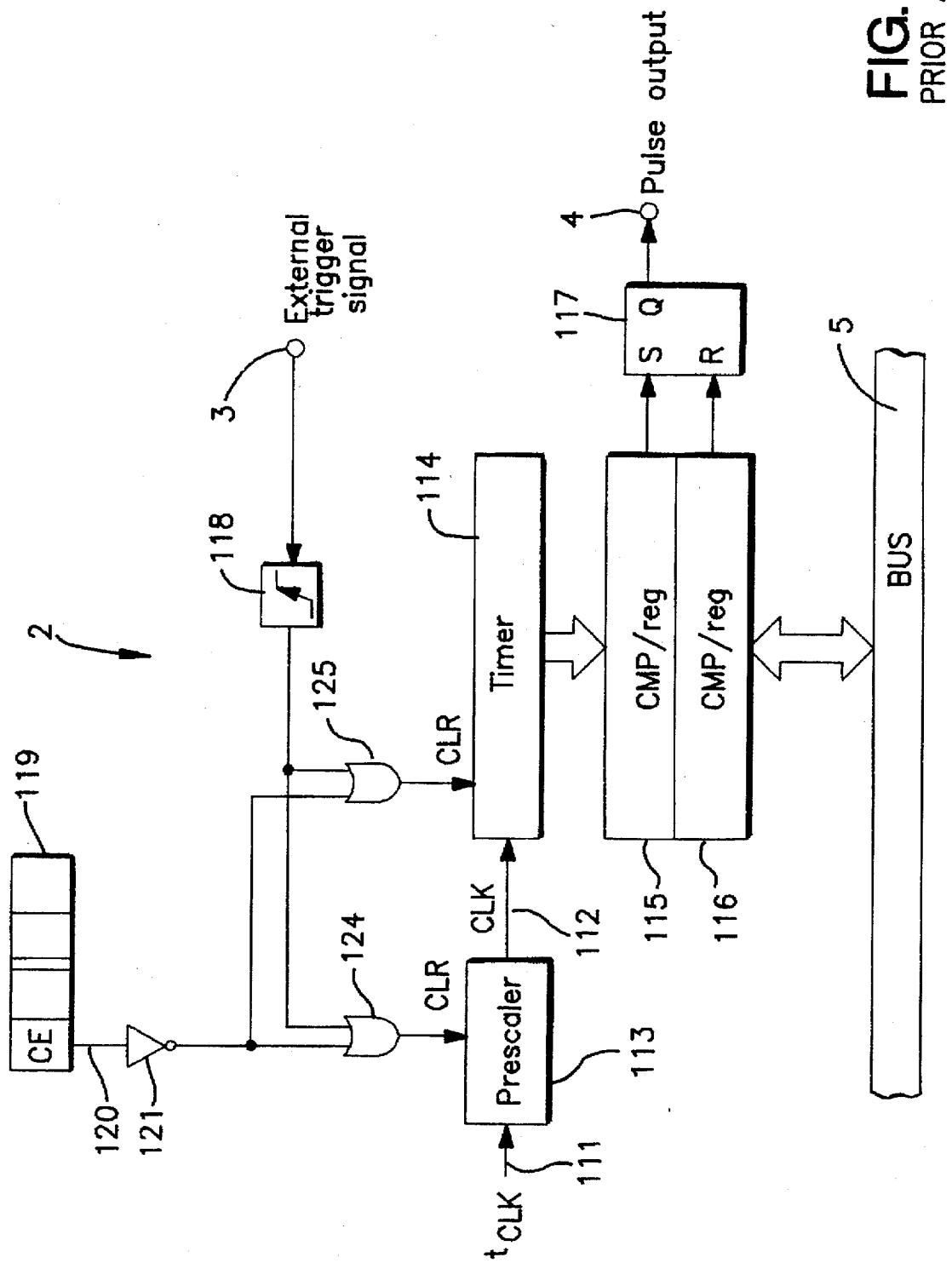
FIG. 6 is a block diagram showing a conventional example of the timer unit in FIG. 5.
Figure 7:
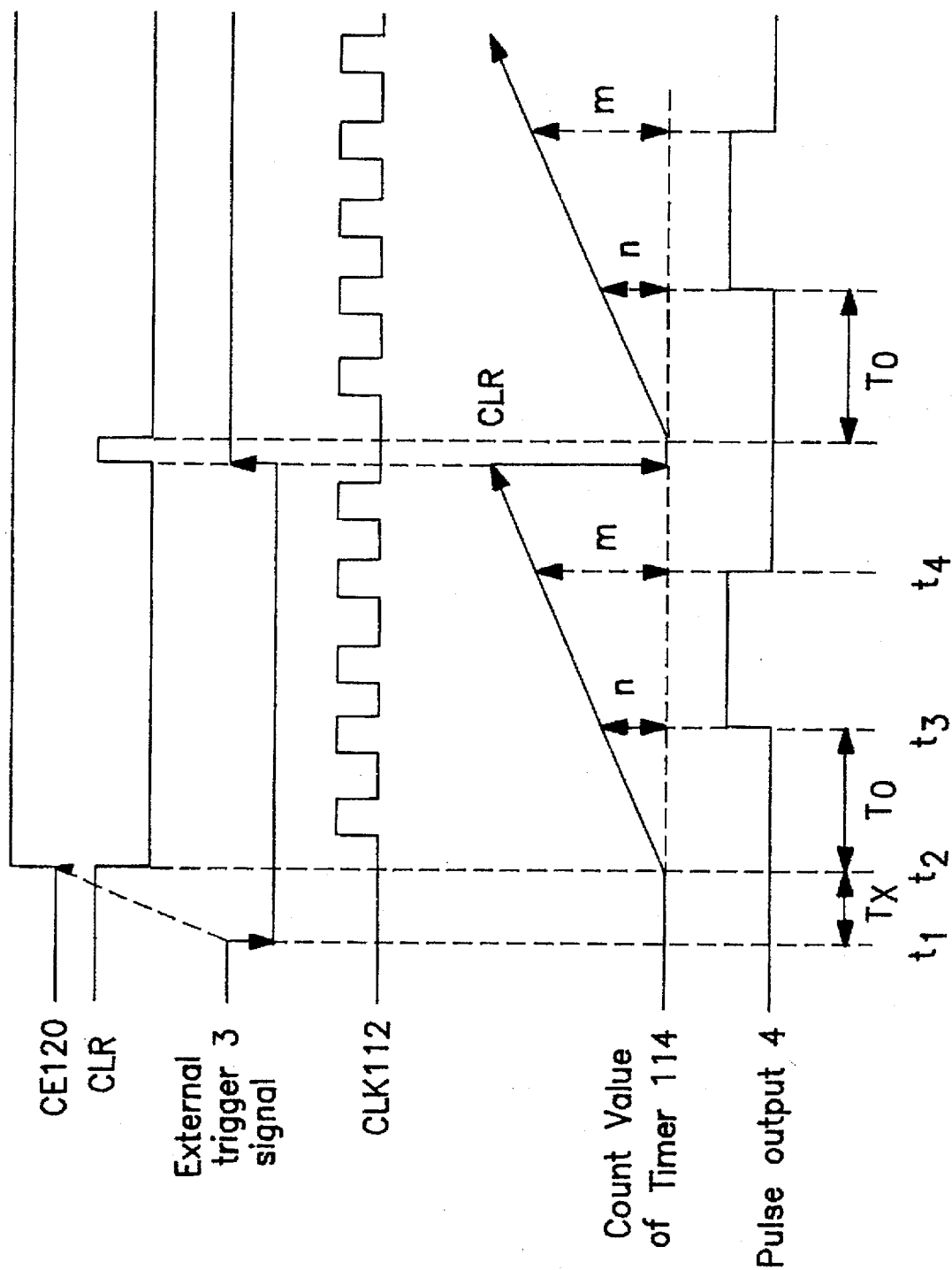
FIG. 7 is a timing chart showing the operation of the timer unit in FIG. 6.

In FIG. 1 which is a block diagram of the timer unit according to a first embodiment of this invention, identical symbols are assigned to the components equivalent to those in FIG. 6. It will be assumed that the configuration of the data processor of this embodiment is the same as that of FIG. 5.

This timer unit is equipped with a prescaler 113 which outputs a clock CLK 112 obtained by demultiplying a system clock $f_{CLK}$ 111 at a specified demultiplication ratio, a timer 114 which counts the clock CLK 112. A first compare register 115 which compares the count value of the timer 114 with a set value (n) set therein and outputs a compare match signal, a second compare register 116 which similarly compares the count value of the timer 114 with a set value (m) set therein and outputs a compare match signal, an FF 117 which receives the compare match signal from the compare register 115 as the set input and the compare match signal from the second compare register 116 as the reset input. An edge detection circuit 118 which detects a level change of the external trigger signal, a control register 119 which controls the operation of the timer 114 and the prescaler 113, a count enable register CE 120, an inverter 121 connected to the CE 120, an AND gate 122 which ANDs the output of the edge detection circuit 118 and the output of the CE 120, an FF 123 which receives the output of the inverter 121 as the set input and the output of the AND gate 122 as the reset input, an OR gate 124 which ORs the output of the edge detection circuit 118 and the output of the FF 123, and an OR gate 125 which ORs the output of the edge detection circuit 118 and the output of the inverter 121.

The output of the OR gate 124 is connected to the clear input of the prescaler 113, and the output of the OR gate 125 is connected to the clear input of the timer 114.

The compare registers 115 and 116, and the control register 119 are connected to an internal bus 5, and it will be assumed that data can be set by the program processing by a CPU 1.

As mentioned above in connection with the processor shown in FIG. 5, during the system reset operation, the CPU 1 writes the control register 119 with the count-enable flag CE 120 of logic "0". The output of the inverter 121 thereby goes to the "high" level to set the FF 123. Therefore, the prescaler 113 and the timer 114 are set in the cleared state through the OR gates 125 and 124.

The count-enable flag CE 120 is thereafter changed to logic "1" by CPU 1. This processing is carried out in the system reset operation or the program execution just after the system reset operation. Accordingly, the output of the OR gate 125 goes to the "low" level, so that the cleared state of the timer 114 is released. On the other hand, the output of the OR gate 124 is still at the "high" level, so that the prescaler 113 maintains the cleared state. Accordingly, the clock CLK 112 remains at the "low" level. The counter 114 performs no counting operation.

Under this condition, when the external device changes the trigger signal from the "high" level to the "low" level to inform the processor of the requirement of the control pulse, the edge detection circuit 118 detects the level change and outputs a one-shot pulse. This pulse changes the output of the AND gate 122 to the "high" level so that the FF 123 is reset. The output of the OR gate 124 is thereby changed to the "low" level. The clear state of the prescaler 113 is thus released. The prescaler 113 starts operating and then produces the clock CLK 112 which is in turn supplied to and thus counted by the timer 114.

Now, assume that the values of the compare registers 115 and 116 are set to "n" and "m", respectively, and the two values satisfy the relation n<m. First as the counted value of the timer 114 reaches "n", the FF 117 is set by the compare match signal of the compare register 115 and a level of an output terminal 4 goes to the "high" level.

Further, when the counted value of the timer 114 reaches "m" by the continuation of the increment operation, the FF 117 is reset by the compare match output of the compare register 116, and the level of the pulse output terminal 4 goes to the "low" level. The timer 114 further continues the increment operation in response to the clock CLK 112.

Figure 2:
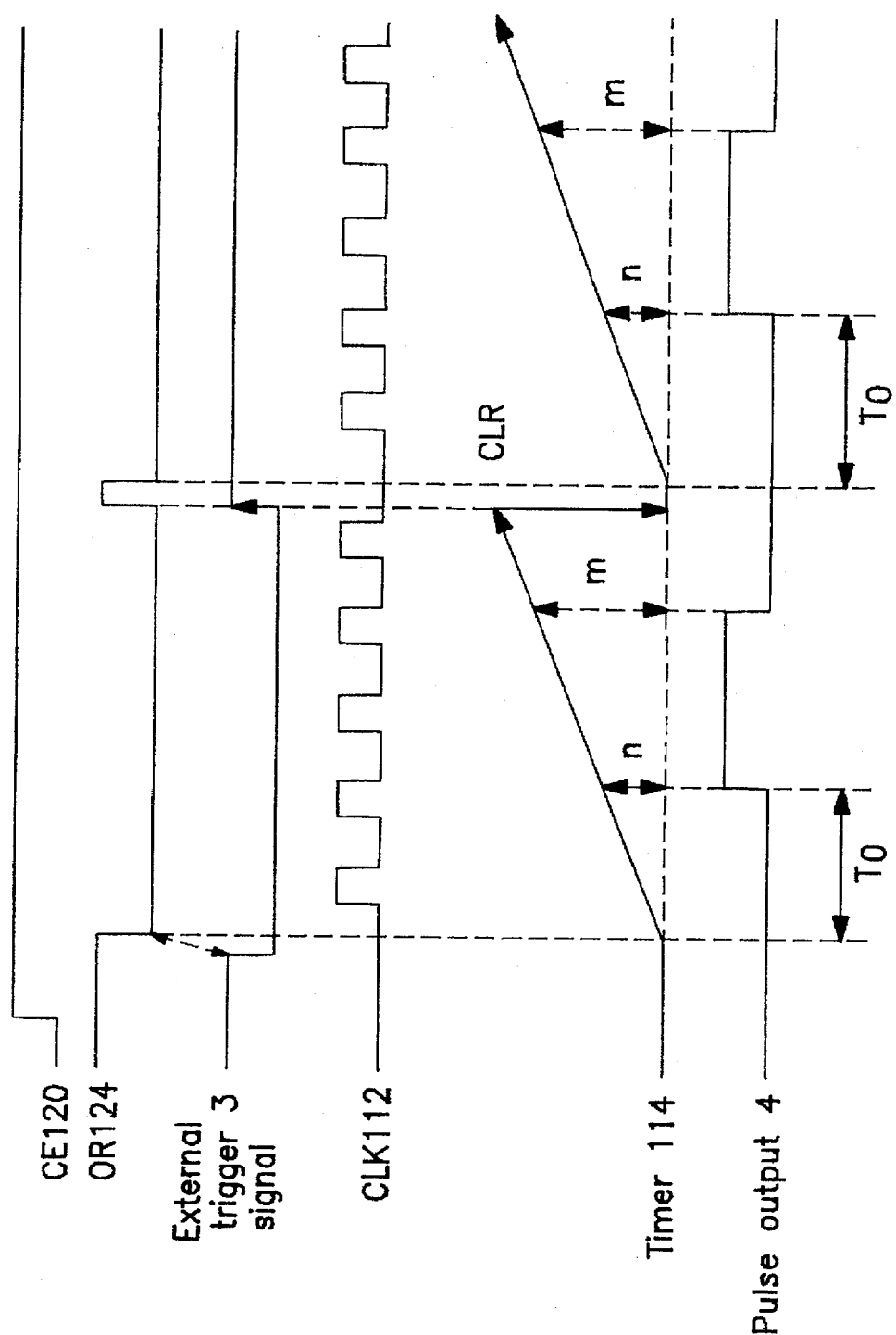
FIG. 2 is timing chart showing the operation of the timer unit FIG. 1.

Although not shown explicitly in FIG. 2, the timer 114 overflows in due time unless there occurs a change of the input level of the external trigger signal, and performs again the increment operation starting with "0".

Now, let us consider the operation when the level of the external trigger signal changes from the "low" level to the "high" level before the timer 114 overflows. As the level of the external trigger signal changes from the "low" level to the "high" level, the edge detection circuit 118 detects the level change and outputs the one-shot pulse.

Then, the outputs of the OR gates 124 and 125 are activated during the period equal to the activation period of the edge detection pulse, and initialize both the prescaler 113 and the timer 114 by clearing them during this period. The period of time from the clearing to the output of the clock CLK 112 from the prescaler 113 can always be fixed uniquely since it depends upon the constitution of the hardware. Accordingly, the period of time after the initialization brought about by the level change of the external trigger input until the output of the clock CLK 112 can always be determined uniquely. Therefore, the period of time from the edge input of the external trigger signal to the clearing of the timer 114 and the restart of the increment operation from "0" is exactly equal to that in the case where the timer 114 is started from its halt state caused by the edge input of the external trigger signal.

Accordingly, unless the respective values n and m of the compare registers 115 and 116 change, the period of time from the edge input of the external trigger signal to the change in the output pulse becomes always constant. In addition, even when the set values n and m are changed, the timing of the pulse output change corresponding to the set values can be determine uniquely.

Namely, if the count enable signal from the CE 120 is at the "high" level regardless of the timer 114 being in the halt state or in the counting operation, it is always possible to uniquely determine the pulse output timing based only on the edge input timing of the external trigger signal, so that the pulse output in response to the external trigger signal can always be accomplished precisely in real time.

Moreover, as described in the above, the timer 114 and the prescaler 113 ignore the level change of the external trigger signal if the signal of the CE 120 is at the "low" level, and accept the level change of the external trigger signal if the signal of the CE 120 goes to the "high" level. Therefore, it is possible to designate the start enable or disable of the timer by the external trigger signal by the mere control of the level of the CE 120 by means of the program processing. Because of that, it becomes possible to control the operation of the timer start in all the scenes during the operation, not only at immediately after the system reset.

Figure 3:
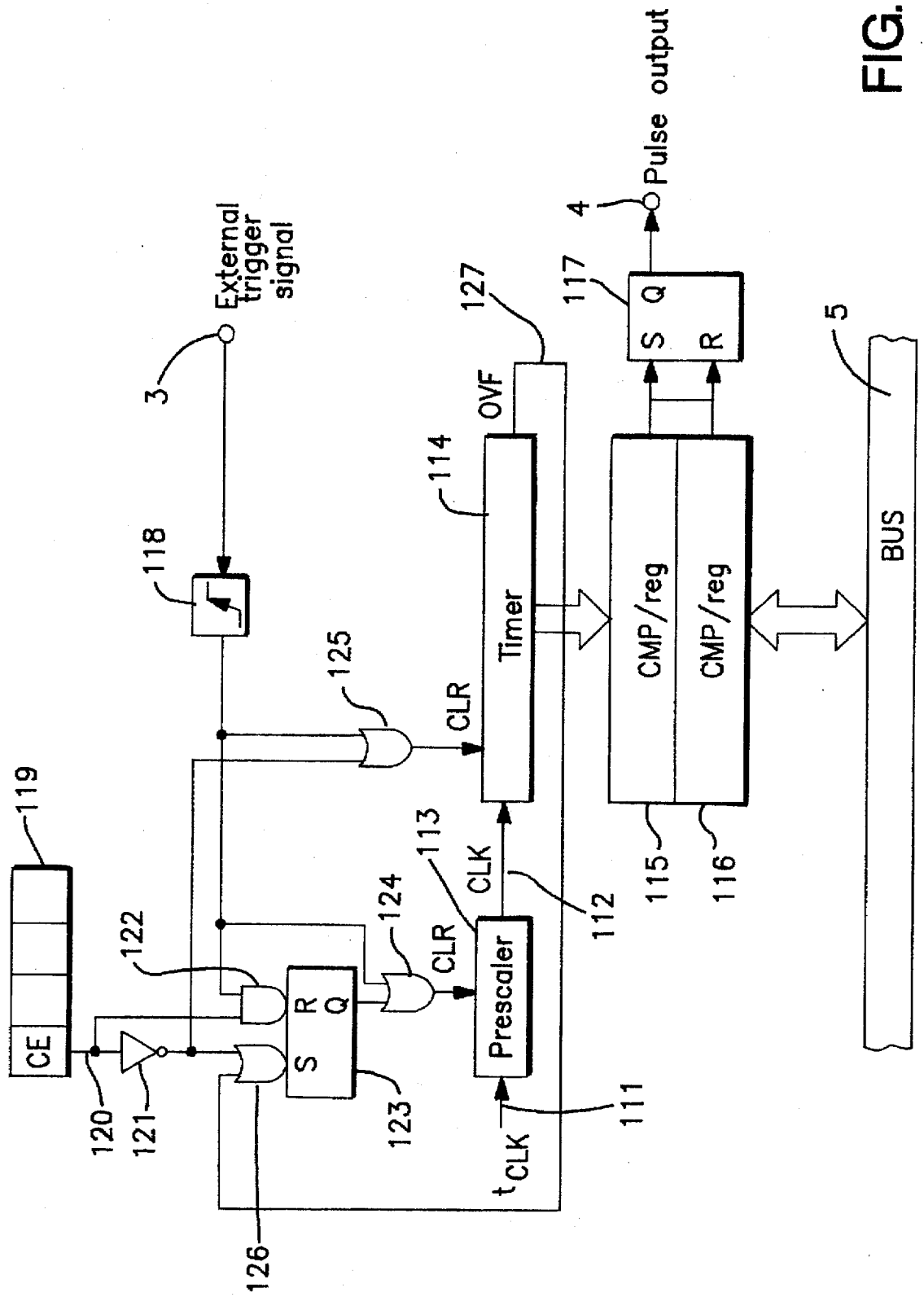
FIG. 3 is a block diagram of the timer unit of another embodiment of this invention.

In FIG. 3 which shows a block diagram of a second embodiment of the timer unit of this invention, equivalent components to those in FIG. 1 are shown by identical symbols. Describing only the components that are different from those of FIG. 1, the timer 114 generates an overflow signal OVF 127 when it overflows, and the overflow signal OVF 127 is served as one input to a two-input OR gate 126. The output of the inverter 121 is input to the other input of the OR gate 126, and the FF 123 is set by the output of the OR gate 126.

Figure 4:
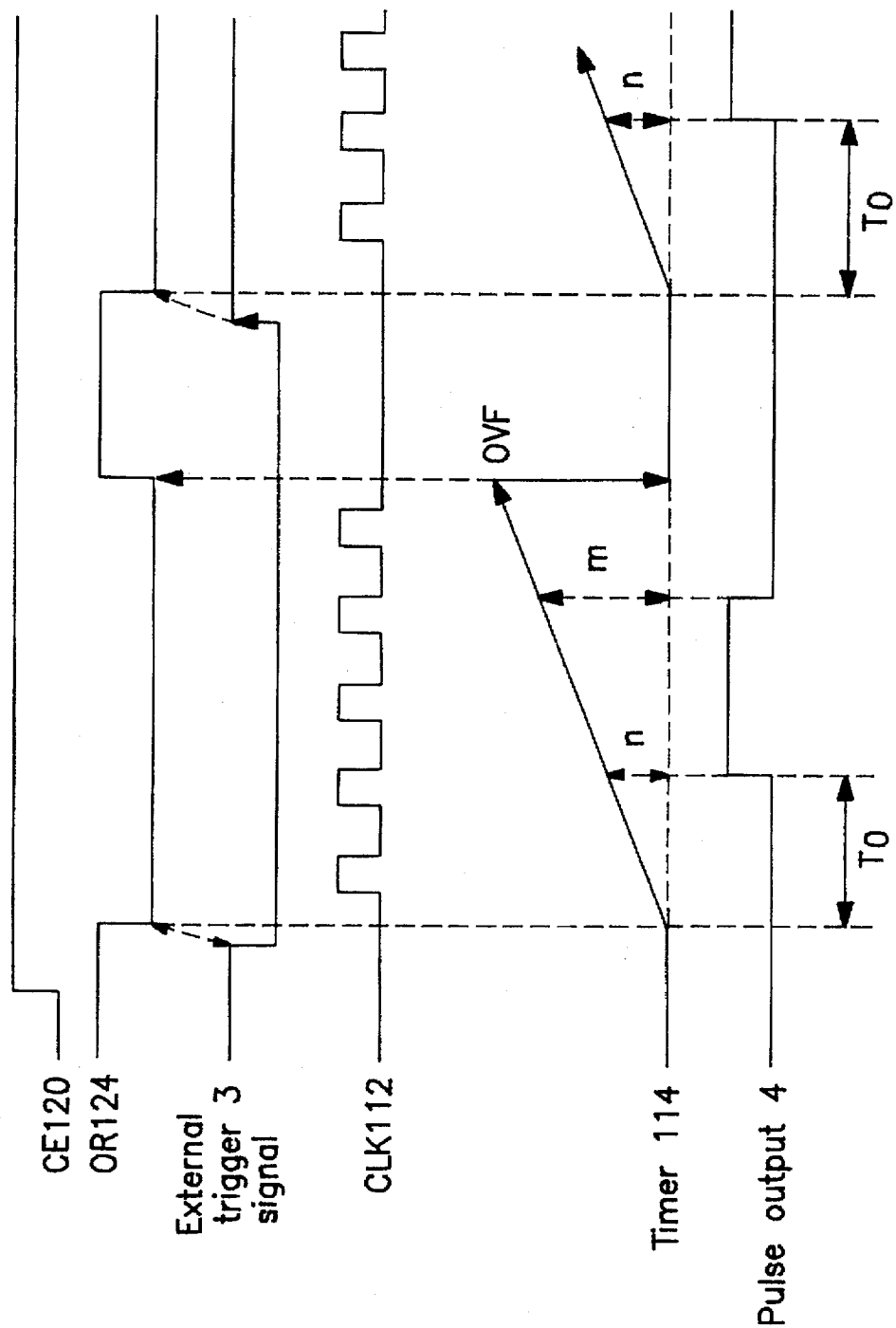
FIG. 4 is a timing chart showing the operation of the timer unit in FIG. 3.

Referring to a timing chart in FIG. 4, the operation of the timer unit will be described. During the count enable signal of the CE 120 being at the "low" level, the output of the inverter 121 goes to the "high" level, and hence, the output of the OR gate 126 goes also to the "high" level, the FF 123 is set and its output goes to the "high" level. Therefore, the output of the OR gate 124 also goes to the "high" level.

Moreover, since the output of the inverter 121 is at the "high" level, the output of the OR gate 125 goes also to the "high" level, and from these facts, both the prescaler 113 and the timer 114 are in the cleared state. At that time, the input level of the external trigger signal is assumed to be at the "high" level.

Next, when the signal of the CE 120 is brought to the "high" level by setting data to the control register 119 through the program processing of the CPU 1, the output of the inverter 121 goes to the "low" level.

When the input level of the external trigger signal is constant, the output of the edge detection circuit 118 is at the "low" level, and hence, the output of the OR gate 125 goes to the "low" level, so that the cleared state of the timer 114 is released. Further, since the timer 114 was halted in the cleared state, the overflow signal OVF 127 is also at the "low" level, and hence the output of the OR gate 126 goes to the "low" level and the set input of the FF 123 goes to the "low" level.

At this point in time, since the output of the edge detection circuit 118 is at the "low" level the AND gate 122 stays at the "low" level, the FF 123 outputs a signal while holding the "high" level without being reset, and accordingly, the OR gate 124 remains at the "high" level and the prescaler 113 continues to be cleared. Thus, since the clock CLK 112 remains as it is (in the halt state), the timer 114 does not perform the counting operation and still remains in the halt state.

Now, if the input level of the external trigger signal makes a change from the "high" level to the "low" level, the edge detection circuit 118 detects this level change and outputs a pulse of one shot. Then, the output of the AND gate 122 goes to the "high" level so that the FF 123 is reset. The edge detection circuit 118 outputs a "low" level signal after output of one-shot pulse. As a result, the output of the OR gate 124 goes to the "low" level and the cleared state of the prescaler 113 is released. Hence, the clock CLK 112 obtained by demultiplying the system clock $f_{CLK}$ 111 at a specified demultiplication ratio is supplied to the timer 114. The timer 114 executes the increment operation in response to the clock CLK 112.

Now, assume that the compare registers 115 and 116 are set to the values "n" and "m", respectively, and the relation n<m holds between the two values. First, as the counted value of the timer 114 reaches "n", the FF 117 is set by the compare match signal from the compare register 115, and the level of the output terminal goes to the "high" level.

When the counted value of the timer 114 reaches "m" by the further continuation of the counting, the FF 117 is reset by the compare match signal from the compare register 116, and the level of the output terminal 4 goes to the "low" level. The timer 114 further continues the increment operation in response to the clock CLK 112.

The operations up to this stage are the same as the operations described in the first embodiment. Moreover, if a change of the input level of the external trigger signal occurs thereafter prior to the overflow of the timer 114, the operations in which both the OR gates 124 and 125 go to the "high" level by the edge detection signal of the edge detection circuit 118, and the prescaler 113 and the timer 114 are cleared to resume again the increment operation from "0", are also identical to those described in the first embodiment.

Now, if the timer 114 continues the increment operation under constant conditions without a change of the level of the external trigger signal, sooner or later the timer 114 overflows to produce an overflow signal OVF 127 which is a "high" level signal. Then, the output of the OR gate 126 goes to the "high" level, and the FF 123 is set. The outputs of the OR gate 123 and the output of the OR gate 124 go to the "high" level to clear the prescaler 113.

Even if the level of the overflow signal OVF 117 goes to the "low" level, as long as the external trigger signal stays at a constant level without outputting the edge detection signal from the edge detection circuit 117, the output of the AND gate 122 remains at the "low" level, so that the FF 123 is not reset and continues to output a "high" level signal.

Therefore, since the OR gate 124 continues to output a "high" level signal and the prescaler 113 remains to be cleared, the clock CLK 112 stays at the inactive level as it has been, and the timer 114 halts the counting. At that time, the timer 114 points to the reading of "0" since the timer is stopped due to the overflow.

The conditions at that time are the same as the conditions at immediately after the signal of the CE 120 is shifted from the "low" level to the "high" level and as already described in the above, it is possible to resume the increment operation of the timer 114 by the level change of the external trigger signal.

The difference between this embodiment and the first embodiment resides in the fact that in the first embodiment, even if there occurs an overflow, the timer continues the counting and continues to output periodic pulses unless there arises the level change of the external trigger signal, whereas in this embodiment the timer stops the counting when it overflows. Therefore, it is possible to carry out a control in which one pulse is output per one level change trigger of the external trigger signal.

As described in the above, according to this invention an effect can be obtained in which, at the time of starting the counting from the initial count halt conditions, the count start can be executed in real time with high precision by carrying out the actual timing control of the count start by means of the hardware in response to the external trigger signal, utilizing the program processing merely for validating the external trigger signal, rather than using the program processing to start the count operation itself.

Moreover, from the fact that the control over the clearing can also be executed simultaneously by the use of the same external trigger signal, a highly precise output of the pulse that employs the external trigger as the reference can be carried out by a single input terminal. Further, the control by the program processing over the timer unit concerning the start control is limited basically only to the data setting processing such as the setting of the compare registers and the control register, and excludes the portion concerning the timing control such as to respond in a minimum time to the input timing of the external trigger. Therefore, it is possible to reduce the load on the program processing, and as a result, the program itself can be simplified so that the size of the program itself, namely, the memory capacity for storing the programs, can also be reduced.

Figure 8:
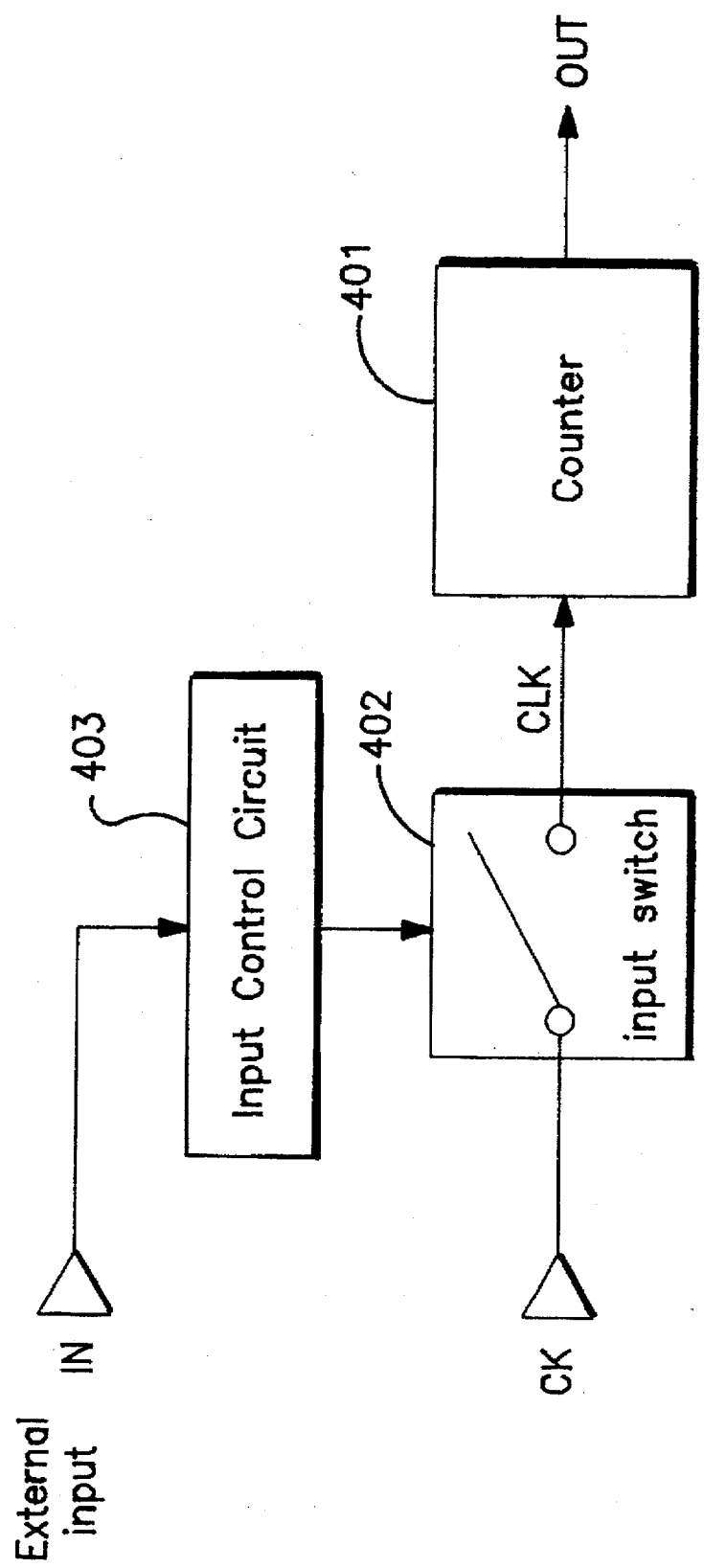
FIG. 8 is a block diagram showing another example of the prior art timer unit.
Figure 9:
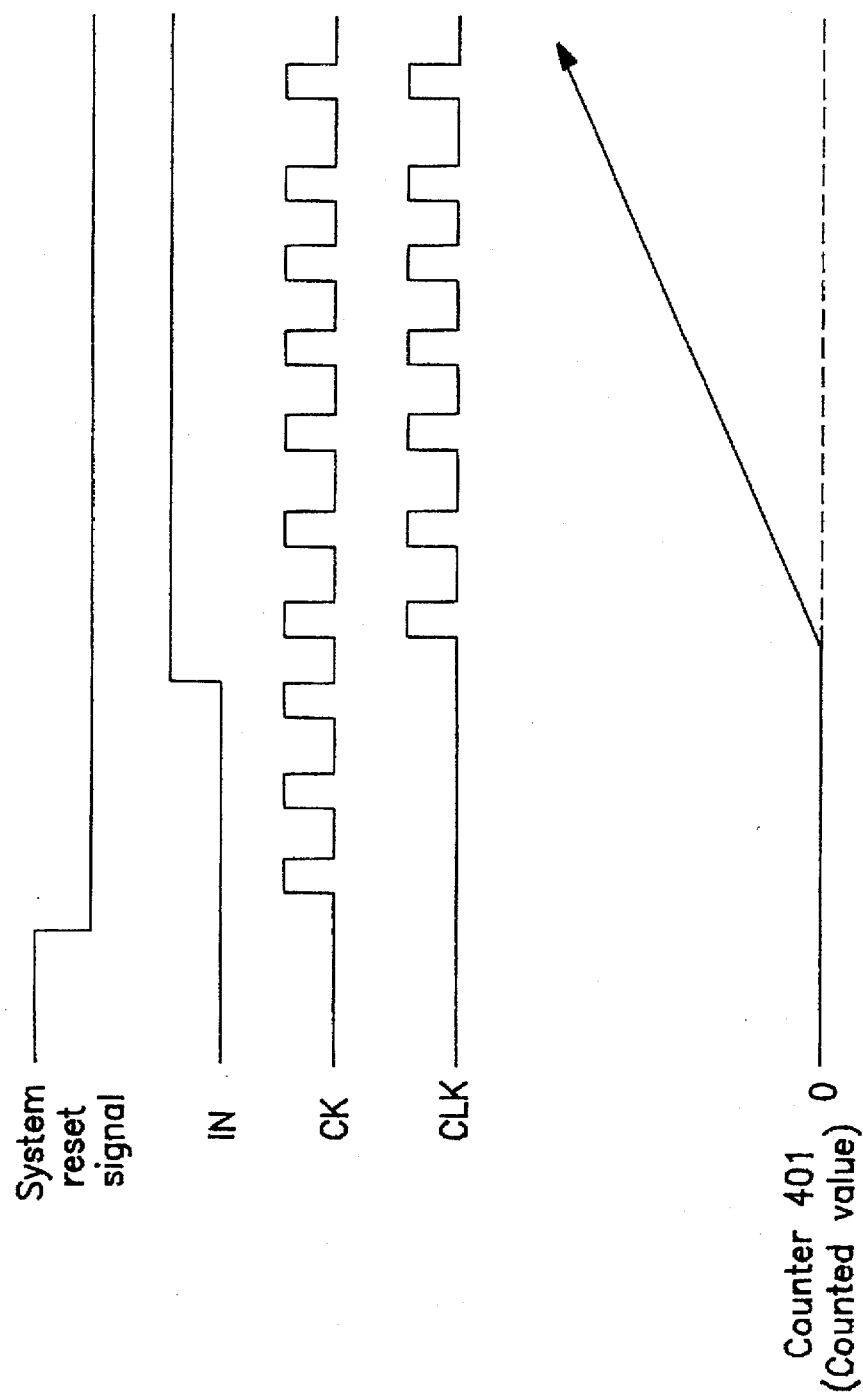
FIG. 9 is a timing chart showing the operation of the timer unit in FIG. 8.

Furthermore, the practical effect of this invention is extremely high since it is possible to provide a data processor excellent in performance and cost effectiveness such as the possible reduction in the manhours required for the preparation of the program like the one shown in the flow chart in FIG. 8.

Although the invention has been described with reference to specific embodiments, this description is not meant to be construed in a limiting sense. Various modifications of the disclosed embodiments, as well as other embodiments of the invention, will become apparent to persons skilled in the art upon reference to the description of the invention. It is therefore contemplated that the appended claims will cover any modifications or embodiments as fall within the true scope of the invention.

What is claimed is:

1. A data processor comprising first means for, when activated, producing a pulse signal in response to a clock signal, storage means for temporarily storing control information settable to one of first and second states, said control information being generated by a microprocessor responsive to a level change in a trigger signal, second means responsive to said first state of said control information for deactivating said first means, third means for detecting supply of said trigger signal to produce a detection signal, and fourth means responsive to said second state of said control information and said detection signal for activating said first means, wherein said fourth means establishes a constant time interval between a level change in said trigger signal and output of said pulse signal.

2. The data processor as claimed in claim 1, wherein said first means includes a timer receiving and counting said clock signal and said fourth means allows said timer to receive and count said clock signal.

3. The data processor as claimed in claim 2, wherein said third means produces said detection signal when said trigger signal is changed in level.

4. A data processor comprising, a counter enable register whose data is set by a central processing unit, an edge detection circuit which detects a change of a level of a trigger signal input and outputs a detection signal, control means receiving input from said counter enable register and said edge detection circuit, said control means outputting a signal with an inactive level when said set data has a first value and for outputting a signal with an active level during the period until said set data reaches said first value when said set data has a second value and said trigger signal goes to the active level, a prescaler which is inactivated when the output of said control means is at the inactive level and outputs a modified clock signal obtained by scaling an input reference clock when the output of said control means is at the active level, and a timer which is inactivated when said set data is at the first value and is activated when said set data is at the second value and counts the scaled clock output by said prescaler, wherein said control means establishes a constant time interval between a level change in said trigger signal and activation of said timer.

5. The data processor as claimed in claim 4, wherein said control means further includes means which brings the output to the inactive level in response to an overflow signal output when said timer has attained a specified counted number.

6. The data processor as claimed in claim 4, further comprising a first and a second comparison means receiving and comparing the output of said timer with respective stored first and second data and outputting first and second comparison results, and generation means for generating a pulse in response to the comparison results of said first comparison means and said second comparison means.

7. The data processor as claimed in claim 6, wherein said generation means is an RS flip-flop having a set terminal receiving the first comparison result and a reset terminal receiving the second comparison result.

* * * * *